(12) United States Patent　　(10) Patent No.: US 11,011,945 B2
Shirsat　　(45) Date of Patent: May 18, 2021

(54) SYSTEMS AND METHODS FOR WIRELESS CHARGING AND WIRED DATA TRANSFER

(71) Applicant: Western Digital Technologies, Inc., San Jose, CA (US)

(72) Inventor: Rohan Shirsat, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 171 days.

(21) Appl. No.: 16/274,626

(22) Filed: Feb. 13, 2019

(65) Prior Publication Data

US 2020/0204008 A1　　Jun. 25, 2020

Related U.S. Application Data

(60) Provisional application No. 62/784,267, filed on Dec. 21, 2018.

(51) Int. Cl.
*H02J 50/80*　　(2016.01)
*G06F 13/38*　　(2006.01)
*H02J 7/00*　　(2006.01)

(52) U.S. Cl.
CPC ............ *H02J 50/80* (2016.02); *G06F 13/382* (2013.01); *H02J 7/0027* (2013.01); *H02J 7/00036* (2020.01); *G06F 2213/0042* (2013.01)

(58) Field of Classification Search
CPC .................................................... H02J 50/80
USPC ........................................................ 320/108
See application file for complete search history.

(56) References Cited

U.S. PATENT DOCUMENTS

| 8,688,037 | B2 | 4/2014 | Chatterjee et al. |
| 8,938,366 | B2 | 1/2015 | Nielsen et al. |
| 9,318,915 | B2 | 4/2016 | Miller et al. |
| 9,515,514 | B2 | 12/2016 | Lee et al. |
| 9,601,929 | B2 | 3/2017 | Khan et al. |
| 9,698,628 | B2 | 7/2017 | Cain et al. |
| 9,819,216 | B2 | 11/2017 | Klawon et al. |
| 9,880,587 | B2 | 1/2018 | Gueorguiev et al. |

(Continued)

FOREIGN PATENT DOCUMENTS

| CN | 104578219 | 4/2015 |
| CN | 204555984 | 8/2015 |

(Continued)

OTHER PUBLICATIONS

International Search Report issued in application No. PCT/US2019/048187 dated Dec. 18, 2019.

(Continued)

*Primary Examiner* — Jerry D Robbins
(74) *Attorney, Agent, or Firm* — Brinks Gilson & Lione

(57) ABSTRACT

Disclosed are devices and methods for performing wireless charging of an electronic device and establishing a wired connection with the electronic device for data transfer. In some cases, a device includes a port that can supply power to charge the electronic device when a wired connection is detected between the device and the electronic device. The device can be configured such that the port does not supply power to the electronic device via wired connection when the device provides charging power to the electronic device wirelessly. Data transfer between the device and the electronic device can be performed via the port at the same time as wirelessly charging the electronic device.

20 Claims, 6 Drawing Sheets

(56) References Cited

U.S. PATENT DOCUMENTS

| | | | | |
|---|---|---|---|---|
| 2005/0181839 A1* | 8/2005 | Tiainen | ................ | H02J 3/42 |
| | | | | 455/573 |
| 2010/0013431 A1* | 1/2010 | Liu | ................ | H01F 5/003 |
| | | | | 320/108 |
| 2011/0050164 A1* | 3/2011 | Partovi | ................ | H02J 7/00034 |
| | | | | 320/108 |
| 2012/0007549 A1 | 1/2012 | Murayama et al. | | |
| 2013/0207602 A1 | 8/2013 | Fukaya | | |
| 2013/0229148 A1* | 9/2013 | Khan | ................ | H04B 5/0037 |
| | | | | 320/108 |
| 2013/0249481 A1 | 9/2013 | Jacobs et al. | | |
| 2016/0072327 A1 | 3/2016 | Knutson et al. | | |
| 2018/0131847 A1* | 5/2018 | Kokonaski | ......... | H04N 5/23241 |
| 2019/0148968 A1* | 5/2019 | Kim | ................ | H04B 5/0037 |
| | | | | 320/108 |

FOREIGN PATENT DOCUMENTS

| | | |
|---|---|---|
| CN | 204578127 | 8/2015 |
| CN | 205068816 | 10/2015 |
| CN | 106169816 | 11/2016 |
| CN | 107707001 | 2/2018 |
| EP | 1946426 | 6/2016 |
| EP | 2472353 | 7/2016 |
| EP | 2601724 | 2/2017 |
| EP | 3291404 | 3/2018 |
| JP | 04705988 | 6/2011 |
| KR | 806562 | 2/2008 |
| KR | 1492388 | 2/2015 |
| KR | 10-2015-0142215 A | 12/2015 |
| KR | 10-1620450 B1 | 5/2016 |
| KR | 10-2017-0136353 A | 12/2017 |
| WO | WO2012081028 | 6/2012 |
| WO | WO2017027917 | 2/2017 |
| WO | WO2017209502 | 12/2017 |

OTHER PUBLICATIONS

Written Opinion issued in application No. PCT/US2019/048187 dated Dec. 18, 2019.

"The SanDisk iXpand Base is an iPhone charger that also backs up your phone," Aug. 31, 2017, available at https://www.theverge.com/circuitbreaker/2017/8/31/16235148/sandisk-ixpand-base-iphone-charger-back-up-phone.

Reddit, r/AndroidAuto, 2019, available at https://www.reddit.com/r/AndroidAuto/comments/7k9i95/phone_that_supports_simultaneous_wireless/.

HUB IT (2018).

Fusion 2017 Memory & Charging Kit for iPhone (Apr. 2017).

\* cited by examiner

SYSTEMS AND METHODS FOR WIRELESS CHARGING AND WIRED DATA TRANSFER

TECHNICAL FIELD

Certain embodiments disclosed herein relate to systems and methods for wireless charging and wired data transfer, including concurrent wireless charging and wired data transfer.

BACKGROUND

Portable electronic devices, such as smartphones, tablets, smartwatches, have become ubiquitous. Such devices can include a rechargeable battery and memory for storing data. There exists a need for systems and methods that can recharge the battery and back-up data from a portable electronic device seamlessly and efficiently. Existing charging and data transfer devices suffer from one or more disadvantages. For example, charging can be interrupted by data transfer and vice versa. Systems and method disclosed herein advantageously solve the shortcomings of existing devices.

BRIEF DESCRIPTION OF THE DRAWINGS

The innovations described in the claims each have several aspects, no single one of which is solely responsible for its desirable attributes. Without limiting the scope of the claims, some prominent features of this disclosure will now be briefly described.

Systems and methods that embody the various features of the disclosure will now be described with reference to the following drawings, in which.

DETAILED DESCRIPTION

Figure 1A:
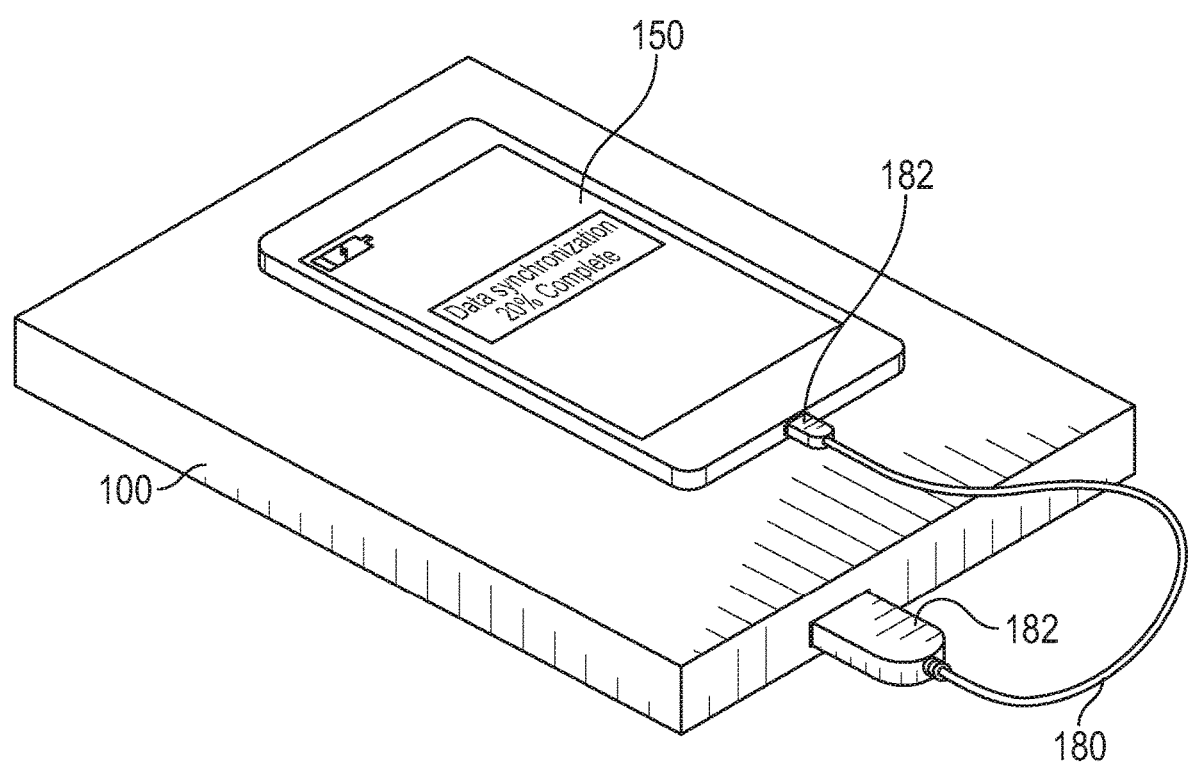
FIG. 1A illustrates a schematic view of a hybrid device for wireless charging and wired data transfer according to some embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Wireless charging has become increasingly widespread and popular over the past few years. Wireless charging allows users to charge various electronic devices without having those devices tethered to a wall plug or other charging devices. By eliminating the need for cords to charge electronic devices, wireless charging technology has made charging electronic devices simpler and more convenient. However, wireless charging can be interrupted or suspended when a charging device detects that power is provided to charge an electronic device, such as a smartphone, a tablet, smartwatch, or the like, via a port of the charging device. In accordance with wireless charging protocols, such as those developed by the Wireless Power Consortium, wired charging can be given priority over wireless charging. However, since wired data transfer can be faster than wireless data transfer, it can be advantageous to perform wired data transfer without interrupting or suspending wireless charge capabilities. Some embodiments disclosed herein solve these problems by allowing for simultaneous wireless charging and wired data transfer.

In some cases, a system for wirelessly charging and transferring over wired connection data from an electronic device can include a housing, a charging circuit, a storage device, and a controller. The charging circuit can be supported by the housing and configured to wirelessly charge an electronic device. The storage device can be supported by the housing and configured to store data received from the electronic device. The controller can be connected to the charging circuit and a data-transfer-and-charging interface. The data-transfer-and-charging interface can be supported by the housing and connected to the storage device.

The data-transfer-and-charging interface can be configured to receive data from an electronic device over a wired connection according to a data transfer protocol and charge the electronic device over the wired connection according to a wired charging protocol. The interface can include a data transfer pin configured to receive data from the electronic device. The interface can include a first pin configured to supply power to the electronic device wherein the controller is configured to interrupt the wireless charging in response to detecting that power is supplied to the electronic device via the first pin. The interface can include a second pin configured to permit detection of connection of the electronic device to the data-transfer-and-charging interface, wherein the controller is configured to initiate data transfer from the electronic device over the data transfer pin in response to detecting that the electronic device is connected to the data-transfer-and-charging interface. The first pin can be disabled to not cause interruption of wireless charging during data transfer from the electronic device over the data-transfer-and-charging interface.

According to the data transfer protocol, the first pin can be configured to permit detection of connection of the electronic device to the data-transfer-and-charging interface to cause initiation of the data transfer. The first pin can be disconnected from a power source. The data transfer protocol can comprise universal serial bus (USB) protocol. The data-transfer-and-charging interface can comprise a Lightning connector interface. The electronic device can comprise a mobile phone. The second pin can be configured to receive power supplied by the electronic device to the second pin when the electronic device is connected to the data-transfer-and-charging interface via the wired connection, and wherein connection of the electronic device is detected in response to sensing the power supplied by the electronic device. The controller can sense the power supplied by the electronic device and detect connection of the electronic device in response the sensed power. The power supplied by the electronic device to the second pin when the electronic device is connected to the data-transfer-and-charging interface can indicate a logic high state.

In some cases, a system for charging and transferring data from an electronic device can include a power source, a charging circuit configured to wirelessly charge an electronic device, a controller connected to the charging circuit and a tat transfer and charging port, and a port configured to receive data from the electronic device over a wired connection and charge the electronic device over the wired connection. The port can include a first pin configured to supply power from the power source to the electronic device over the wired connection, wherein the controller is configured to suspend the wireless charging in response to detecting that power is supplied via the first pin, and wherein the first pin is disabled. The port can include a second pin configured to facilitate detection that the electronic device is connected to the port, wherein the controller is configured to initiate data transfer from the electronic device in response to detecting that the electronic device is connected to the port.

The data can be transferred according to a data transfer protocol, and wherein the data transfer protocol designates the first pin as facilitating detection of connection of the electronic device to the port to cause initiation of the data transfer. The first pin can be disconnected from a power source. The controller can be configured to cause the data transfer and wireless charging to be performed simultaneously. The port can comprise a Lightning connector port. The second pin can be configured to receive power from the electronic device when the electronic device is connected to the data-transfer-and-charging port via the wired connection, and wherein detection that the electronic device is connected to the port is performed based on sensing power on the second pin. The sensing power on the second pin can comprise sensing a logic high state.

In some cases, a method for charging and transferring data from an electronic device is provided. A first pin of an interface configured to be connected to the electronic device over a cable can be disabled, the first pin being configured to supply power to the electronic device over the cable. The wireless charging can be configured to be suspended in response to supplying power to the electronic device via the first pin when the electronic device is connected to the interface. The method can include wirelessly charging an electronic device. The method can further include detecting that the electronic device is connected to the interface by monitoring a second pin of the interface. The method can further include in response to detecting that the electronic device is connected to the interface, transferring data from the electronic device while wirelessly charging the electronic device.

The second pin can be configured to receive power from the electronic device when the electronic device is connected to the interface via the cable, and wherein monitoring the second pin comprises detecting power on the second pin. The detecting power on the second pin can comprise detecting a logic high state. The first pin can be designated as facilitating detection of connection of the electronic device to the interface via the cable. The interface can comprise a Lightning connector interface.

In some cases, a system for charging and transferring data from an electronic device is provided. The system can include a charging circuit configured to wirelessly transfer power to an electronic device, a storage device configured to store data received from the electronic device, a controller connected to the charging circuit and a port, and the port configured to receive data from the electronic device over a wired connection according to a data transfer protocol and charge the electronic device over the wired connection. The port can include a first pin configured to receive power from the electronic device, wherein the controller is configured to detect that the electronic device is connected to the port in response to power being received by the second pin. The port can include a second pin configured to receive data from the electronic device, wherein the controller is configured to initiate data transfer from the electronic device in response to detecting that the electronic device is connected to the port.

The port can be configured to receive data according to a universal serial bus (USB) protocol, and wherein during the data transfer, the system operates as a peripheral device under the USB protocol and the electronic device operates as a host device under the USB protocol.

In some cases, a system for charging an electronic device and transferring data from the electronic device includes charging means for wirelessly charging the electronic device, connector means for receiving data from the electronic device over a wired connection and charging the electronic device over the wired connection, and controlling means for controlling the charging means and the connector means. The connector means can include power supplying means for supplying power to the electronic device over the wired connection. The controlling means can be further for suspending wireless charging in response to detecting that power is supplied via the power supplying means, and wherein the power supplying means is disabled. The connector means can also include detection means for facilitating detection that the electronic device is connected to the connector means. The controlling means can be further for initiating data transfer from the electronic device through the connector means in response to detecting that the electronic device is connected to the connector means.

The data can be transferred according to a data transfer protocol. The data transfer protocol can designate the power supplying means as facilitating detection of connection of the electronic device to the connector means to cause initiation of the data transfer. The power supplying means is disconnected from a means for providing power. The controlling means can be further for initiating the data transfer and wireless charging. The connector means can comprise a Lightning connection port.

Charging and Data Transfer System

FIG. 1A illustrates an electronic device 150 coupled to a charging and data transfer device 100 via a cable 180 according to some cases. The electronic device 150 may be a mobile electronic device such as a smartphone, a tablet, a smartwatch, a laptop, a videogame console, and the like. Wireless charging may be initiated when the electronic device 150 is placed on the device 100 or brought within a predetermined distance from the device 100. The cable 180 can include connectors 182 that can be coupled to ports of the electronic device 150 and the device 100.

Figure 1B:
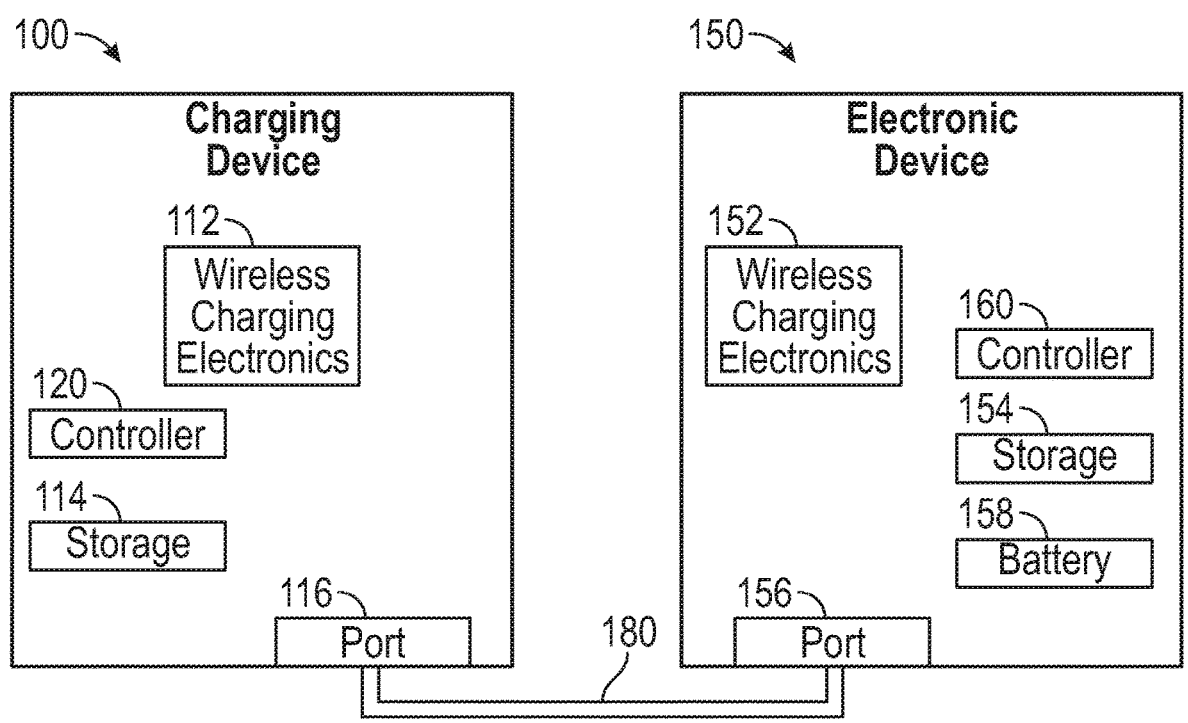
FIG. 1B illustrates a schematic diagram of hybrid device, such as the device of FIG. 1A, connected to an electronic device according to some embodiments.

FIG. 1B illustrates a schematic diagram of a charging and data transfer device, such as the device 100, connected to an electronic device, such as the electronic device 150, via a cable, such as the cable 180 according to some cases. The device 100 can include a wireless charging electronics 112 configured to provide power wirelessly to the electronic device, a storage 114, a port 116, and a controller 120. The electronic device 150 can likewise include a wireless charging electronics 152 configured to receive power wirelessly, a storage 154, a port 156, and a power source 158, such as a battery. The device 100 can include a power source or be connected to an external power source. Any of storages 114 or 154 can include one or more of volatile or non-volatile memory, such as magnetic memory, solid state memory, or the like. Any of the storages 114 or 154 can be removable, such as a secure digital (SD) card.

The controller 120 can be operatively coupled to the wireless charging electronics 112 such that it can control one or more of the other electronic components to operate the wireless charging electronics 112. The controller 120 may provide signals to different components or modules of the device 100 to control operation of the device 100. For example, the controller 120 can detect wired connection between the device 100 and the electronic device 150 via the cable 180 connecting the ports 116 and 156 by detecting or receiving a signal from the port 116. The signal can, for instance, indicate that the electronic device 150 is providing power over to the port 116. The controller 120 may facilitate data transfer between the electronic device 150 and the device 100 by receiving data from the electronic device 150 via the cable 180 and the port 116 and directing the storage 114 to store the data.

The wireless charging electronics 112 of the device 100 and the wireless charging electronics 152 of the electronic device 150 can allow wireless charging of the electronic device 150. The wireless charging electronics 152 of the electronic device 150 may be a receiver while the wireless charging electronics 112 of the device 100 may be a transmitter. The wireless charging electronics 152 and wireless charging electronics 112 can include a coil that can receive and/or transfer, respectively, power by electromagnetic induction. The wireless charging electronics 152 can provide power to charge the power source 158. The operation of the wireless charging electronics 112 of the device 100, as discussed above, may be controlled by the controller 120.

One or more of the ports 116 or 156 can include a plurality of pins that allow for wired charging of the electronic device 150 and wired data transfer between the device 100 and the electronic device 150.

The cable 180 can be used to operatively connect the port 116 and the port 156 to establish wired connection between the device 100 and the electronic device 150. The cable 180 can vary in length, width, and size. The cable 180 can include one or more conductive wires that allow electronic signals and power to be transmitted. The cable 180 can include connectors 182 (shown in FIG. 1A) that can be coupled with the port 116 of the charging device 100 and/or the port 156 of the electronic device 150. One or more of the connectors 182 can include one or more pins that correspond to pins of the port 116 or port 156. Wired connection can be established by having the electronic device 150 be connected to the charging device 100 via the cable 180.

Figure 2:
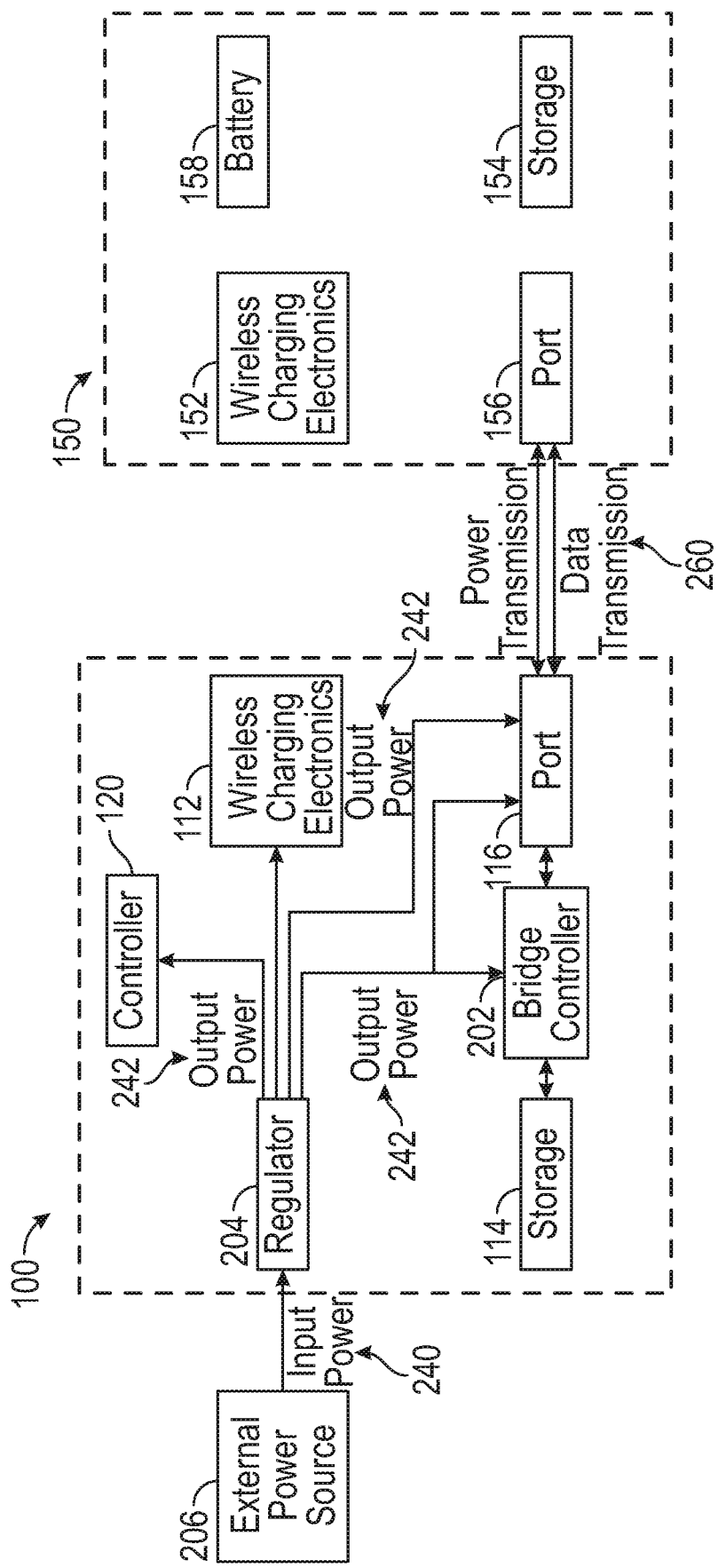
FIG. 2 illustrates another a schematic diagram of a hybrid device, such as the device of FIG. 1A, according to some embodiments.

FIG. 2 illustrates another schematic diagram of a charging and data transfer device, such as the device 100, coupled to the electronic device 150 according to some cases. FIG. 2 shows additional details of the device 100 and the electronic device 150.

The device 100 can include a regulator 204, the wireless charging electronics 112, the port 116, the storage 114, and a bridge controller 202, and the controller 120. The bridge controller 202 can be configured such that it can transmit data between the storage 114 and the port 116. For example, the port 116 can receive data from the electronic device 150 via the cable 180. The bridge controller 202 can receive the data from the electronic device 150 via the port 116 and transmit the data to the storage 114 for storing. In another example, the bridge controller 202 can access or receive data stored in the storage 114 and transmit the data to the electronic device 150 via the port 116 and the cable 180.

The device 100 can be operatively connected to the external power source 206 such that the regulator 204 can receive input power 240 from the external power source 206. The power source 206 can be internal to the device 100. The regulator 204 can process the input power 240 and generate output power 242. The output power 242 can supply power for various electrical elements of the device 100 including the wireless charging electronics 112, the port 116, the bridge controller 202, the storage 114, the controller 120, and the like. The regulator 204 can be configured as one or more of a voltage regulator, current regulator, or the like. For example, the regulator 204 can be a stepdown regulator.

Output power 242 can vary for different electronic elements or modules of the device 100. For example, output power 242 can have a voltage between about 5 volts (V) and about 20V for the wireless charging electronics 112. In another example, output power 242 can have a voltage of about 5V for the port 116. The voltage input for the port 116 can be used to supply power to charge the electronic device 150 when there is a wired connection between the electronic device 150 and the device 100 via the cable 180.

As discussed herein, certain wireless charging protocols provide wired charging a priority over wireless charging. This is illustrated in FIG. 2 by the arrows 260 showing transmission of both data and power over the wired connection or interface that includes one or more of the ports 116 and 156 and the cable 180. If the device 100 (for example, via the controller 120) detects that the electronic device 150 is connected to the device 100 over a wired connection and/or that the port 116 is providing power to charge the electronic device 150 (which can be triggered automatically in response to detecting that the electronic device 150 is connected over the wired connection), it can interrupt or suspend wireless charging and give priority to wired charging. This can be problematic when users want to wirelessly charge the electronic device and transfer data in the electronic device over the wired cable, for example for backing up the data to the device 100. Since wired data transfer can be faster than wireless data transfer, it may be advantageous to configure the device 100 such that it can provide wired data transfer without interrupting or suspending wireless charging of the electronic device 150. This can be advantageous for various reasons, such as providing the flexibility to wirelessly charge electronic devices via the device 100, wirelessly charging and transferring data from electronic devices that do not permit simultaneous charging and data transfer, and the like.

Figure 3:
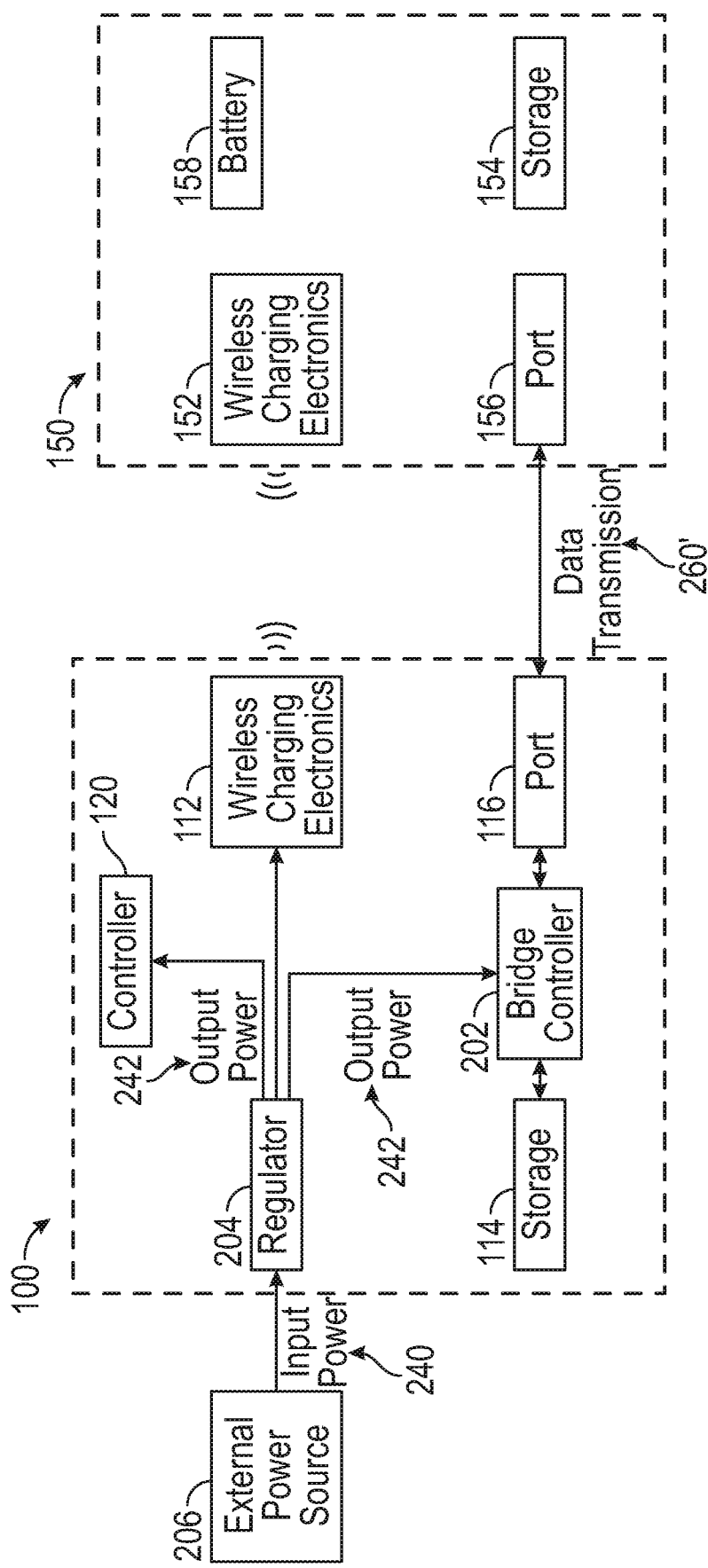
FIG. 3 illustrates yet another a schematic diagram of a hybrid device, such as the hybrid device of FIG. 1A, according to some embodiments.

FIG. 3 illustrates a schematic diagram of a charging and data transfer device, such as the charging device 100, coupled to the electronic device 150 according to some cases. FIG. 3 illustrates that power is no longer provided over the wired interface between the device 100 and the electronic device 150. Instead, the device 100, shown in FIG. 3, provides power to the electronic device 150 via the wireless charging electronics 112 and wireless charging electronics 152.

Various methods to prevent power from being supplied to the port 116 can be used. For example, the controller 120 can send a signal to the regulator 204 to prevent the regulator 204 from transmitting power to the port 116 and/or to one or more pins of the port 116 as described herein. In another example, the controller 120 can disable a circuitry of the regulator 204 such that the regulator 204 cannot supply power to the port 116 and/or to one or more pins of the port. As yet another example, the controller 120 may interrupt electrical connection between the regulator 204 and the port 116 to prevent the port 116 and/or one or more pins of the port from receiving power from the regulator 204. As yet another example, one or more pins of the port 116 configured to supply power to the electronic device 150 can be disabled or disconnected. This can be accomplished, for instance, by interrupting the electrical connection between a pin and the regulator 204. For instance, as shown in FIG. 3, the connection between the regulator 204 and port 116 and/or one or more pins of the port illustrated in FIG. 2 has been removed and the arrow 260' illustrates transmission of data, but not power of the wired connection.

Power may not be supplied to the port 116 in various circumstances. As disclosed, power may not be supplied when wireless charging is initiated and/or when the device 100 and electronic device 150 are connected by the cable. In addition or alternatively, the port 116 may not receive power when the controller 120 receives a user input. The user input may be received via a user interface such as a switch or a touchscreen of the device 100.

According to some data transfer protocols, such as universal serial bus (USB) protocol, a pin of the port 116, such as a pin 400 (see FIGS. 4A and 4B), can be used for charging the electronic device 150 via the wired connection over the cable 180. In some cases, the pin can also be used as a detection mechanism indicating that the electronic device 150 is connected to the device 150 over the wired interface in order to initiate wired data transfer between the device 100 and the electronic device 150. For example, the pin can receive power from the electronic device 150 when the device is connected over the wired connection. Detecting the received power can indicate that the electronic device has 150 has been connected and that data transfer can be initiated. Therefore, when the pin has been disconnected as described herein, it may be advantageous to provide an alternative method to detect physical connection between the device 100 and the electronic device 150 in order to initiate the data transfer.

In some cases, an output pin of the port 156 can be used for permitting detection of wired connection. For example, the output can be utilized as a general purpose input/output (GPIO) signal. For example, a GPIO signal from the electronic device 150 can be used to detect a wired connection between the device 100 and the electronic device 150. A GPIO pin of the port 156 can provide over the cable 180 an output voltage from the electronic device 150 to a corresponding pin of the port 116. The voltage can be, for example, 3.3V for an iPhone or 5V for an Android device. Sensing of the voltage at the corresponding pin of the port 116 can be used to detect the wired connection between the device 100 and the electronic device 150. Using the GPIO output from the electronic device 150 as a detection mechanism for the wired connection between the device 100 and the electronic device 150 can be advantageous because it allows the device 100 to perform wireless charging of the electronic device 150 and initiate data transfer without interrupting or suspending the charging. This detection can be performed by the controller 120 as described herein.

In some cases, a default state of the GPIO pin can be a logic low (approximately 0V) when the electronic device 150 is not connected to the device 100 over the wired connection. When the electronic device 150 is connected over the wired connection, the state of the GPIO pin can change to a logic high (greater than 0V, such as approximately 3.3V) because the electronic device 150 supplies an electrical signal to the GPIO pin. Such change in the state of the GPIO pin can be used to detect that the electronic device 150 is connected over the wired connection. In some cases, instead of or in addition to varying the voltage, current of the electrical signal can be varied.

Figure 4A:
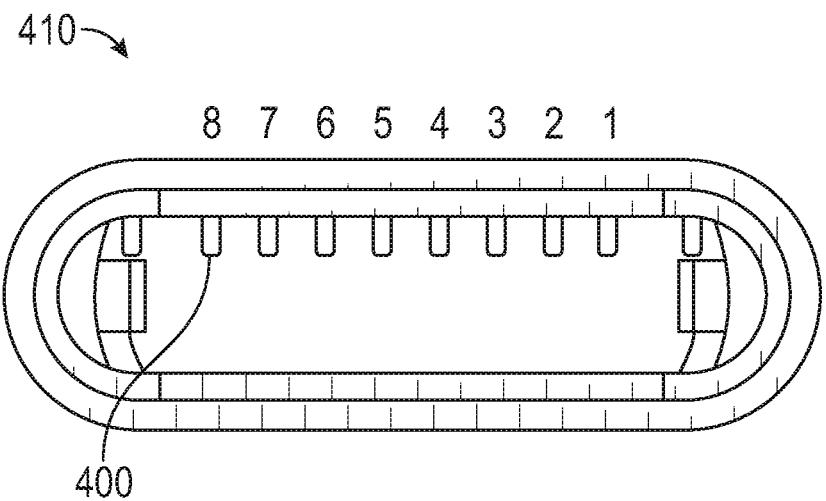
FIGS. 4A and 4B illustrate various port pinouts according to some embodiments.

FIG. 4A illustrates a pinout 410 of one or more of the ports 116 or 156 according to some cases. The pinout 410 can include one or more pins 400 that can conduct electrical signals between the device 100 and the electronic device 150. For example, as shown in FIG. 4A, the pinout 410 (for example, Lightning connector pinout used by Apple devices) can include eight pins 400.

The pins 400 can establish electrical connection between the ports 116 and 156 over the cable 1802. When the electronic device 150 is connected to the device 100 via the cable 180, the pins 400 of the ports 116 and/or 156 can mate with corresponding pins of the connectors 182 of the cable 180 to transfer one or more of control signals, power, or data between the device 100 and the electronic device 150.

For example, the pins 400 shown in FIG. 4A may be configured such that Pin 1 serves as a ground connection, Pin 5 (sometimes referred to as VBUS pin) serves as a power source that supplies power to the electronic device 150 via the cable 180 (for example, 5V), Pins 2 and 3 serve as positive and negative pins, respectively, for transmission of first data over the wired connection, and Pin 4 serves as an identification/control pin for the first data. Pins 6 and 7 may serve as positive and negative pins, respectively, for transmission of second data over the wired connection, and Pin 8 may serve as an identification/control pin for the second data. In some cases, as explained herein, Pin 5 (or VBUS pin) on the device 100 side can be disconnected from supply of power in order to not interrupt or suspend wireless charging. Any of the pins 1 to 4 or 5 to 8, such as the pins 4 or 8 can instead be used as a GPIO pin to signal that the electronic device 150 is connected to the device 100 over the wired connection. For example, the device 100 can detect a signal, such as a logic high signal as described herein, transmitted by the electronic device 150 via one or more of the Pins 4 or 8. In some cases, any of the pins 1 to 4 or 5 to 8 can provide an electrical signal at approximately 3.3V that can be used to detect that the electronic device 150 is connected to the device 100 over the wired connection. The electrical signal, such as 3.3V signal, can be normally utilized to charge an accessory connected to the electronic device 150, but instead can be used to detect that the electronic device is connected over the wired connection.

Figure 4B:
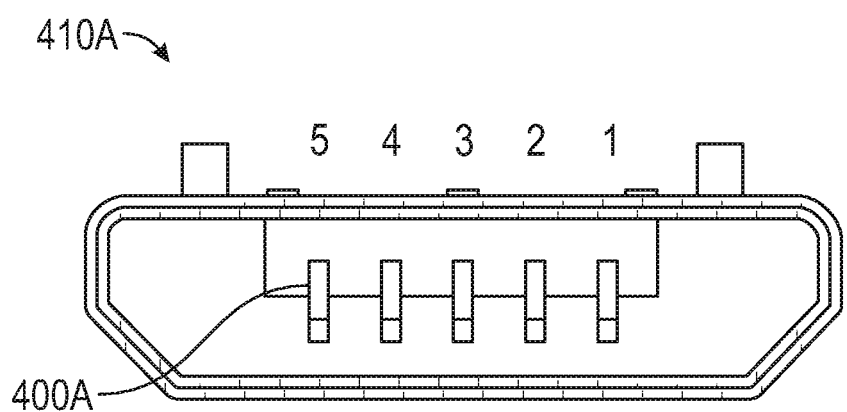

FIG. 4B illustrates another pinout 410A according to some cases. Parts, components, and features of the pinout 410A are identified using the same reference numerals as the corresponding parts, components, and features of the pinout 410, except that a letter "A" has been added thereto. The illustrated pinout 410A includes one or more pins 400A. As shown in FIG. 4B, the pinout 410 (for example, micro USB pinout used by Android devices) can include five pins 400A.

The pins 400A shown in FIG. 4B may be configured such that Pin 1 (or VBUS pin) serves as a power source for the electronic device 150, Pin 2 and Pin 3 serve as negative and positive, respectively (or vice versa) pins for transmission of data over the wired connection, Pin 4 serves an identification pin, and Pin 5 as a ground connection. The identification pin (Pin 4) can define roles of devices connected to each other over the wired connection. For example, on the electronic device 150 side, the identification pin can be grounded, for example, in the connector 182. On the device 100 side, corresponding identification pin can be floating. In accordance with a data transfer protocol (such as the USB protocol), the electronic device 150 can detect that the identification pin (Pin 4) is grounded in the connector 182. Further, in response to detecting that the identification pin is grounded, the electronic device 150 can supply power over Pin 1, such as approximately a 5V power signal. As described herein, by sensing transmission of power over the cable 180, the device 100 can detect that the electronic device 150 is connected over the wired connection.

Charging and Data Transfer Method

Figure 5:
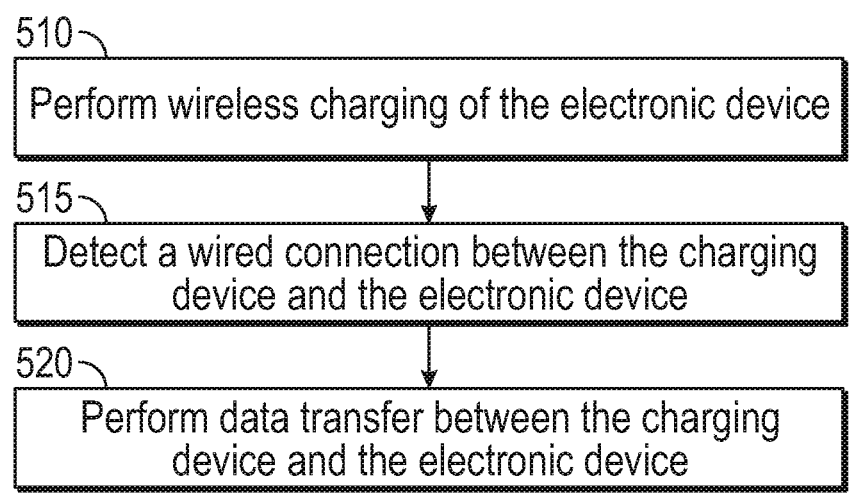
FIG. 5 illustrates a method of wireless charging and wired data transfer according to some embodiments.

FIG. 5 illustrates a method 500 for wirelessly charging the electronic device 150 and transferring data over a wired connection according to some cases. The method can be performed by any of the charging devices disclosed herein. The method can be at least partially performed by the controller 120.

As described herein, a pin configured to charge the electronic device 150 over the wired connection can be disabled such wireless charging is not interrupted or suspended when the electronic device is connected to the device 100 via the cable 180 to facilitate data transfer.

At step 510, the method 500 performs wireless charging of the electronic device 150. As described herein, for example, when the wireless charging electronics 152 is proximate to the wireless charging electronics 112 of the device 100, the method 500 can use the wireless charging electronics 112 to perform wireless charging of the electronic device 150. The wireless charging of the electronic device 150 can begin automatically when the wireless charging electronics 152 is brought proximate to the wireless charging electronics 112. In some cases, the method 500 can prompt for user input prior to starting wireless charging of the electronic device 150.

At step 515, the method 500 detects a wired connection between the device 100 and the electronic device 150 via the cable 180. As discussed above, wireless charging can be configured to be suspended or interrupted in response to supplying power to the electronic device 150 via, for example, a first pin of the wired interface between the electronic device 150 and the device 100. However, since the first pin of the port 116 is disabled as described herein, wireless charging can continue interrupted even when the wired connection is established between the device 100 and electronic device 150 via the cable 180.

The wired connection between electronic device 150 and the device 100 can be detected as described herein. For example, the method 500 can sense a wired connection between the electronic device 150 and the device 100 when it detects a voltage (or current) change between two of the pins 400 of the wired interface. It is contemplated that various methods can be used by the method 500 to detect a wired connection between the electronic device 150 and the device 100 via the cable 180.

At step 520, data transfer is established between the device 100 and the electronic device 150 via the cable 180.

In some cases, a wired connection between the device 100 and the electronic device 150 may be established before wireless charging of the electronic device 150. The method 500 can operate to provide both wired charging of the electronic device 150 and wired data transfer between the device 100 and the electronic device 150 using any of the approaches described herein.

Other Variations

Those skilled in the art will appreciate that in some embodiments, additional or alternative modules can be used to perform functionalities described herein. The actual steps taken in the disclosed processes may differ from those shown in the figures. Additional system components can be utilized, and disclosed system components can be combined or omitted. Depending on the embodiment, certain of the steps described above may be removed, others may be added.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to flash memory as included in any number of devices, such as removable flash cards, embedded memory, solid-state drives (SSDs), hybrid hard drives, and the like. Moreover, while embodiments are described herein as implemented by a controller of a flash memory device, these functionalities may additionally or alternatively be implemented on systems external to a flash memory device. Illustratively, the machine learning algorithms may be implemented on a network-connected system external to a flash memory device, which operates to collect information from any number of devices and to determine correlations between characteristics of memory cells and offsets to operating parameters of such cells. Such system may then transmit learned correlation information or determined offsets to a flash memory device for use by a controller in the manner described above.

The various components illustrated in the figures may be implemented as software and/or firmware on a processor, application-specific integrated circuit (ASIC), field-programmable gate array (FPGA), or dedicated hardware. Hardware components, such as processors, ASICs, FPGAs, and the like, can have logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Various disclosed embodiments are applicable to various types of non-volatile solid-state memory which may comprise one or more of various types of memory devices such as flash integrated circuits, Chalcogenide random access memory (C-RAM), Phase Change Memory (PC-RAM or PRAM), Programmable Metallization Cell RAM (PMC-RAM or PMC), Ovonic Unified Memory (OUM), Resistive RAM (RRAM), NAND memory (for example, single-level cell (SLC) memory, multi-level cell (MLC) memory, or any combination thereof), NOR memory, electrically erasable programmable read-only memory (EEPROM), Ferroelectric Memory (FeRAM), Magnetoresistive RAM (MRAM), other discrete Non-Volatile Memory (NVM) chips, or any combination thereof.

What is claimed is:

1. A system for wirelessly charging an electronic device and transferring data over a wired connection from the electronic device, the system comprising:
   a housing;
   a charging circuit supported by the housing, the charging circuit configured to wirelessly charge the electronic device;

a storage device supported by the housing, the storage device configured to store data received from the electronic device;
a controller connected to the charging circuit and to a data-transfer-and-charging interface; and
the data-transfer-and-charging interface supported by the housing and connected to the storage device, the interface configured to receive data from the electronic device over a wired connection according to a data transfer protocol and charge the electronic device over the wired connection according to a wired charging protocol, the interface comprising:
 a plurality of pins configured to at least one of receive or transmit electrical signals to the electronic device, wherein:
  a first pin of the plurality of pins is configured to supply power to the electronic device in accordance with the wired charging protocol, wherein the controller is configured to interrupt the wireless charging in response to detecting that power is supplied to the electronic device via the first pin;
  a second pin of the plurality of pins is configured to receive power from the electronic device to charge the system, wherein instead of using the power received from the electronic device to charge the system, the data-transfer-and-charging interface is configured to interpret the power received from the electronic device as a general-purpose input-output signal indicating detection of connection of the electronic device to the data-transfer-and-charging interface, wherein the controller is configured to initiate data transfer from the electronic device over the data-transfer-and-charging interface in response to detecting that the electronic device is connected to the data-transfer-and-charging interface; and
  the first pin is disabled, to not interrupt wireless charging during the data transfer from the electronic device over the data-transfer-and-charging interface.

2. The system of claim 1, wherein according to the data transfer protocol, the first pin is configured to permit detection of connection of the electronic device to the data-transfer-and-charging interface to cause initiation of the data transfer.

3. The system of claim 1, wherein the first pin is disconnected from a power source.

4. The system of claim 1, wherein the data transfer protocol comprises universal serial bus (USB) protocol.

5. The system of claim 1, wherein the data-transfer-and-charging interface comprises a Lightning connector interface.

6. The system of claim 1, wherein the electronic device comprises a mobile phone.

7. The system of claim 1, wherein:
the controller is further configured to sense the power supplied by the electronic device to the second pin and to detect a connection between the electronic device and the data-transfer-and-charging interface in response to sensing the supplied power.

8. The system of claim 7, wherein power supplied by the electronic device to the second pin when the electronic device is connected to the data-transfer-and-charging interface indicates a logic high state.

9. A system for charging an electronic device and transferring data from the electronic device, the system comprising:
charging means for wirelessly charging the electronic device;
connector means for receiving data from the electronic device over a wired connection and charging the electronic device over the wired connection,
controlling means for controlling the charging means and the connector means,
wherein the connector means comprises:
 power supplying means for supplying power to the electronic device over the wired connection, the controlling means further for suspending wireless charging in response to detecting that power is supplied via the power supplying means, and wherein the power supplying means is disabled; and
 detection means for facilitating detection that the electronic device is connected to the connector means by receiving power from the electronic device to charge the system, wherein instead of using the power received from the electronic device to charge the system, the detection means interprets the power received from the electronic device as a general-purpose input-output signal indicating detection of connection of the electronic device, the controlling means further for initiating data transfer from the electronic device through the connector means in response to detecting that the electronic device is connected to the connector means.

10. The system of claim 9, wherein:
data is transferred according to a data transfer protocol; and
the data transfer protocol designates the power supplying means as facilitating detection of connection of the electronic device to the connector means to cause initiation of the data transfer.

11. The system of claim 9, wherein the power supplying means is disconnected from a means for providing power.

12. The system of claim 9, wherein the controlling means is further for initiating the data transfer and wireless charging simultaneously.

13. The system of claim 9, wherein the connector means comprises a Lightning connection port.

14. The system of claim 9, wherein the controlling means is further for sensing power on the detection means and detecting that the electronic device is connected to the connector means based on the sensed power.

15. The system of claim 14, wherein sensing power on the detection means comprises sensing a logic high state.

16. A method for charging an electronic device and transferring data from the electronic device, the method comprising:
wirelessly charging an electronic device;
detecting that the electronic device is connected to an interface comprising a first pin and a second pin, the interface configured to connect to the electronic device via a cable by monitoring the second pin of the interface, wherein:
 the first pin is configured to supply power to the electronic device over the cable is disabled; and
 wireless charging is configured to be suspended in response to supplying power to the electronic device via the first pin when the electronic device is connected to the interface; and
in response to detecting that the electronic device is connected to the interface, transferring data from the electronic device while wirelessly charging the electronic device, wherein:
  the second pin is configured to receive power from the electronic device to charge the system, and
  instead of using the power received from the electronic device to charge the system, interpreting the power received from the electronic device as a general-purpose input-output signal indicating detection of connection of the electronic device.

17. The method of claim 16 further comprising:
receiving, via the second pin, power from the electronic device when the electronic device is connected to the interface via the cable; and
monitoring the second pin by detecting power on the second pin.

18. The method of claim 17, wherein detecting power on the second pin comprises detecting a logic high state.

19. The method of claim 16, wherein the first pin is designated as facilitating detection of connection of the electronic device to the interface via the cable.

20. The method of claim 16, wherein the interface comprises a Lightning connector interface.

* * * * *